(12) United States Patent
Zhang et al.

(10) Patent No.: US 11,636,687 B2
(45) Date of Patent: Apr. 25, 2023

(54) ADAPTIVE PROCESSING METHOD FOR NEW SCENES IN AUTONOMOUS DRIVING, AUTONOMOUS DRIVING METHOD AND SYSTEM

(71) Applicant: GUANGZHOU AUTOMOBILE GROUP CO., LTD., Guangzhou (CN)

(72) Inventors: Jiucai Zhang, Sunnyvale, CA (US); Yi Wang, Guangzhou (CN)

(73) Assignee: Guangzhou Automobile Group Co., Ltd., Guangdong (CN)

( * ) Notice: Subject to any disclaimer, the term of this patent is extended or adjusted under 35 U.S.C. 154(b) by 118 days.

(21) Appl. No.: 17/357,206

(22) Filed: Jun. 24, 2021

(65) Prior Publication Data

US 2022/0414384 A1    Dec. 29, 2022

(51) Int. Cl.
*G06V 20/56* (2022.01)
*G06K 9/62* (2022.01)

(52) U.S. Cl.
CPC ........... *G06V 20/56* (2022.01); *G06K 9/6242* (2013.01); *G06K 9/6252* (2013.01); *G06K 9/6256* (2013.01); *G06K 9/6265* (2013.01)

(58) Field of Classification Search
CPC ...... G06N 3/0454; G06N 3/08; G06N 3/0445; G06N 3/04; G06N 3/049; G06N 3/084; G06N 3/063; G06N 3/0481; G06N 20/00; G06N 3/088; G06N 7/005; G06N 20/20; G06N 3/00; G06N 3/02; G06N 3/0472; G06N 5/003; G06N 7/046; G06N 20/10; G06N 3/006; G06N 5/02; G06N 7/023;

(Continued)

(56) References Cited

U.S. PATENT DOCUMENTS 8,379,923 B2 * 2/2013 Ishikawa ................ G01C 21/32
                                                                382/104
8,428,307 B2 * 4/2013 Bradai ............... G08G 1/09623
                                                                382/104

(Continued)

OTHER PUBLICATIONS

Abhishek Gupta, Alagan Anpalagan, Ling Guan, Ahmed Shaharyar Khwaja, Deep learning for object detection and scene perception in self-driving cars: Survey, challenges, and open issues, Array, vol. 10, 2021, 100057, ISSN 2590-0056, https://doi.org/10.1016/j.array.2021.100057, Printed Online Feb. 23, 2021. (Year: 2021).*

*Primary Examiner* — Tahmina N Ansari

(74) *Attorney, Agent, or Firm* — Rosenberg, Klein & Lee

(57) ABSTRACT

An adaptive processing method for new scenes in autonomous driving, comprising: obtaining scene data corresponding to new scene of vehicle driving, wherein the scene data describes vehicles state and driving operations in the new scene; obtaining a test set of the new scene based on processing the scene data by a preset distribution; updating parameters of a pre-training model by inputting the test set, and obtaining a scene model adapted to the new scene based on gradient iteration of general model parameters of the pre-training model, wherein the scene model is configured to output an autonomous driving strategy for the vehicle in the new scene. Therefore, the autonomous driving vehicle transforms a new scene to a known scene, and no longer be troubled by unpredictable new scenes, and greatly enhance the reliability and stability of autonomous driving.

15 Claims, 4 Drawing Sheets

(58) Field of Classification Search
CPC . G06T 2207/20084; G06T 2207/10016; G06T 2207/20081; G06T 3/4053; G06T 5/002; G06T 7/11; G06T 3/4007; G06T 5/001; G06T 3/40; G06T 3/4046; G06T 1/20; G06T 7/246; G06T 15/005; G06T 15/06; G06T 2207/20021; G06T 2207/30232; G06T 5/50; G06T 9/001; G06T 1/60; G06T 2210/12; G06T 7/215; G06T 9/00; G06T 11/001; G06T 11/60; G06T 15/10; G06T 2207/20182; G06T 2207/30236; G06T 2207/30242; G06T 2207/30252; G06T 7/254; G06T 7/50; G06T 7/521; G06T 7/70; G06T 9/40; G06T 15/04; G06T 15/08; G06T 15/40; G06T 2207/10152; G06T 7/248; G06T 7/74; G06T 15/506; G06T 17/10; G06T 17/20; G06T 2200/12; G06T 2207/10024; G06T 2207/10028; G06T 2207/10048; G06T 2207/20208; G06T 2207/30241; G06T 2207/30244; G06T 2210/21; G06T 2210/36; G06T 3/4023; G06T 5/003; G06T 7/579; G06T 7/73; G06T 9/002; H04N 19/117; H04N 19/154; H04N 19/33; H04N 19/59; H04N 19/86; H04N 19/46; H04N 19/142; H04N 19/172; H04N 19/176; H04N 19/177; H04N 19/31; H04N 19/36; H04N 19/80; H04N 19/87; H04N 7/0117; H04N 19/63; H04N 5/23254; H04N 5/23267; H04N 5/77; H04N 19/17; H04N 19/85; H04N 5/2354; H04N 5/232; H04N 5/23218; H04N 5/23222; H04N 5/23225; H04N 5/23227; H04N 5/23229; H04N 5/23241; H04N 5/351; H04N 19/124; H04N 19/13; H04N 19/136; H04N 19/14; H04N 19/179; H04N 19/186; H04N 19/20; H04N 19/90; H04N 5/2256; H04N 5/232411; H04N 5/247; H04N 7/183; G06K 9/6215; G06K 9/6247; G06K 9/6282; G06K 9/6286; G06K 9/6217; G06K 9/624; G06K 9/6249; G06K 9/6255; G06K 9/6256; G06K 9/6268; G06K 9/627; G06K 9/6271; G06K 9/628; G06K 9/6292; G06V 10/40; G06V 30/194; G06V 20/40; G06V 10/82; G06V 20/52; G06V 10/764; G06V 20/44; G06V 40/10; G06V 10/7715; G06V 10/454; G06V 20/46; G06V 10/426; G06V 10/462; G06V 10/62; G06V 20/41; G06V 40/103; G06V 10/24; G06V 10/267; G06V 10/451; G06V 10/56; G06V 10/758; G06V 20/20; G06V 20/56; G06V 10/44; G06V 10/772; G06V 10/774; G06V 10/803; G06V 10/809; G06V 10/945; G06V 10/95; G06V 10/96; G06V 20/698; G06V 2201/07; G06V 30/19173; G06V 30/2504

See application file for complete search history.

(56) References Cited

U.S. PATENT DOCUMENTS

| | | | |
|---|---|---|---|
| 8,849,494 B1* | 9/2014 | Herbach | G05D 1/0297 701/24 |
| 10,600,199 B2* | 3/2020 | Kamata | G06V 20/58 |
| 2020/0142405 A1* | 5/2020 | Havens | G05D 1/0212 |
| 2021/0311076 A1* | 10/2021 | Kipnis | A61B 5/055 |
| 2022/0036261 A1* | 2/2022 | Achar | G06Q 10/04 |

* cited by examiner

ADAPTIVE PROCESSING METHOD FOR NEW SCENES IN AUTONOMOUS DRIVING, AUTONOMOUS DRIVING METHOD AND SYSTEM

TECHNICAL FIELD

The present disclosure relates to the field of computer application technology, more particularly, to an adaptive processing method for new scenes in autonomous driving, an autonomous driving method, and an autonomous driving system.

BACKGROUND

With the application and development of computer application technology in automotive industry, autonomous driving technology has been developed and applied to vehicles with the support of hardware. The development process of autonomous driving is: manual control only, driving assistance under manual control, and finally to the automatic control of vehicles, and to develop in the direction of opening fully automatic vehicles to the general public.

In fact, vehicles will be driven in different scenes, and different scenes have different vehicle and road conditions, so, autonomous driving strategies need to be formulated for different scenes accordingly. Fully autonomous driving vehicles are limited in the scenes they can handle and can only perform automatic driving under certain conditions. For example, to achieve Level 3 autonomous driving in a prescribed scene, when a new scene deviates from the prescribed scene, the automatic driving fails and the driver needs to take over the vehicle.

Therefore, although existing self-driving vehicles can complete most driving operations, they are not fully automatic driving in all scenes. Once a new scene appears, the vehicle converts from autonomous driving to manual driving. So, it is difficult for vehicles to truly move from laboratories to consumers. In terms of autonomous driving technology, it is urgent to solve the dilemma of autonomous driving lack of adaptability to new scenes.

SUMMARY

There are provided an adaptive processing method for new scenes in autonomous driving, an autonomous driving method and an autonomous driving system. And the technical solution is as below:

According to a first aspect of embodiments of the present disclosure, there is provides an adaptive processing method for new scenes in autonomous driving, comprising:

obtaining scene data corresponding to new scene of vehicle driving, wherein the scene data describes vehicles state and driving operations in the new scene;

obtaining a test set of the new scene based on processing the scene data by a preset distribution;

updating parameters of a pre-training model by inputting the test set, and obtaining a scene model adapted to the new scene based on gradient iteration of general model parameters of the pre-training model, wherein the scene model is configured to output an autonomous driving strategy for the vehicle in the new scene.

According to a second aspect of embodiments of the present disclosure, there is provides an autonomous driving method, comprising:

changing the control mode of the vehicle to manual control when the actual running scene is a new scene in autonomous driving of a vehicle;

obtaining scene data of new scene in the process of manual control of the vehicle, wherein the scene data describes vehicle states in the new scene and the driving operation performed under the manual control;

obtaining a test set of new scene based on processing the scene data by selected preset distribution;

updating parameters of a pre-training model by inputting the test set, and obtaining a scene model adapted to the new scene based on gradient iteration of general model parameters in the pre-training model;

controlling the vehicle to perform driving operations under automatic driving model in the new scene based on the scene model adapted to the new scene.

According to a third aspect of embodiments of the present disclosure, there is provides an autonomous driving system, the automatic driving system is deployed on a vehicle, and comprises a processor and a memory, computer-readable instructions are stored on the memory, when the computer-readable instructions are executed by the processor, realize any one method above.

According to a fourth aspect of embodiments of the present disclosure, there is provides an non-transitory computer-readable storage medium, on-transitory computer-readable storage medium having stored therein instructions that, when executed by a processor of a vehicle, cause the vehicle to perform an adaptive new scenes processing method of autonomous driving, the method comprising:

obtaining scene data corresponding to new scene of vehicle driving, wherein the scene data describes vehicles state and driving operations in the new scene;

obtaining a test set of the new scene based on processing the scene data by a preset distribution;

updating parameters of a pre-training model by inputting the test set and obtaining a scene model adapted to the new scene based on gradient iteration of general model parameters of the pre-training model, wherein the scene model is configured to output an autonomous driving strategy for the vehicle in the new scene.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of the system and the method consistent with aspects related to the invention as recited in the appended claims.

Figure 1:
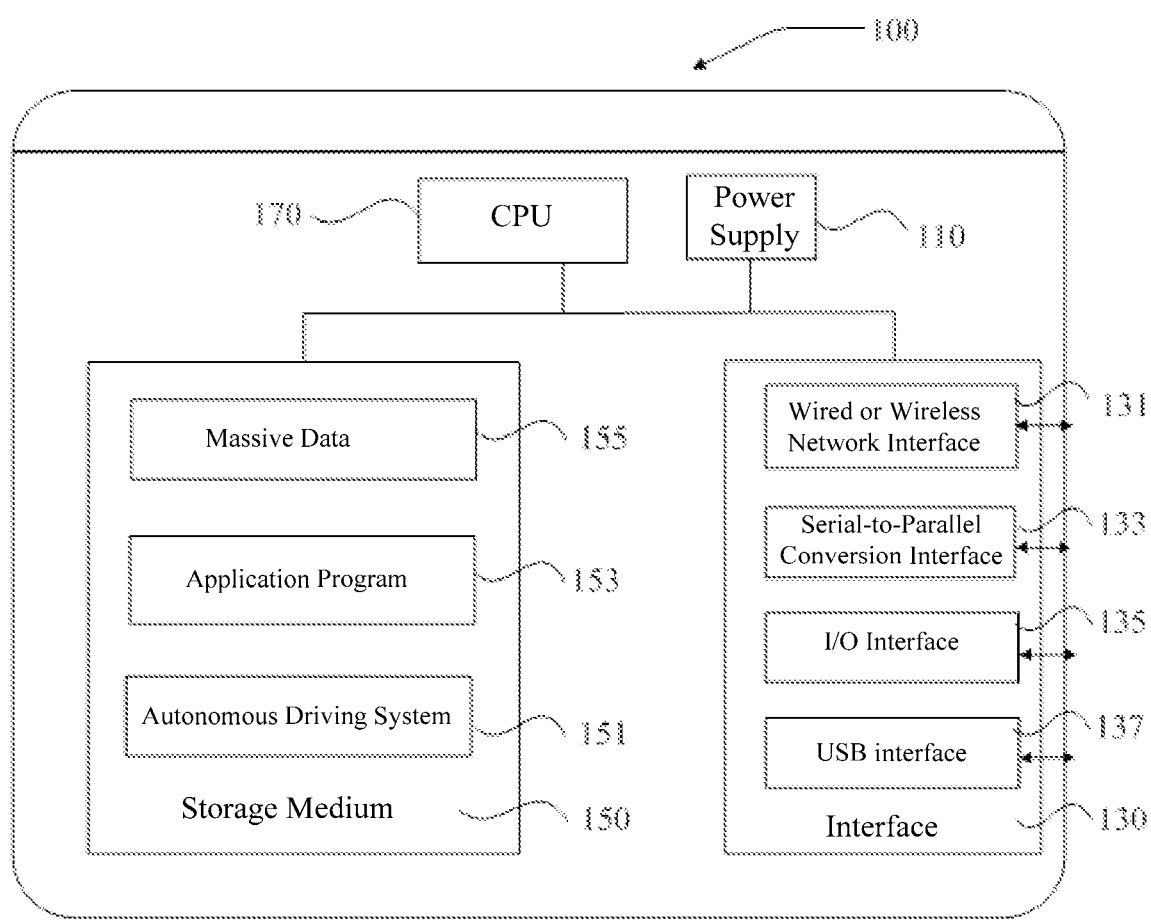
FIG. 1 is a diagram of the hardware structure of the implementation environment involved in the present invention.

FIG. 1 is a diagram of a hardware structure of an implementation environment involved in the present invention. In an exemplary embodiment, the implementation environment is a vehicle equipped with an autonomous driving system. In terms of hardware, the vehicle at least includes a video camera, a radar sensor, a laser rangefinder, and a main control computer.

As shown in FIG. 1, the hardware structure of the main control computer 100 may vary greatly due to differences in configuration or performance. The main control computer 100 may include a power supply 110, an interface 130, at least one storage medium 150, and at least a central processing unit (CPU) 170.

The power supply 110 provides working voltage for each hardware device on the main control computer 100.

The interface 130 include at least one wired or wireless network interface 131, at least one serial-to-parallel conversion interface 133, at least one input/output (I/O) interface 135, and at least one USB interface 137, etc., that is, the interface 130 is configured to communicate with external devices.

The storage medium 150 serves as a carrier for resource storage; may be a random storage medium, a magnetic disk, or an optical disk.

The resources stored on the storage medium 150 include autonomous driving system 151, application program 153, and massive data 155, etc., further; the storage mode may be short-term storage or permanent storage. The autonomous driving system 151 is configured to manage and control various hardware devices and application programs 153 on the main control computer 100, so as to realize the calculation and processing of the massive data 155 by the central processing unit 170. The application program 153 is a computer program that completes at least one specific task based on the autonomous driving system 151. It may include at least one module (not shown in FIG. 1), and each module may include a series of operating instructions. In addition, the massive data 155 may be photos, pictures, etc. stored in a disk.

The central processing unit 170 may include one or more processors configured to communicate with the storage medium 150 via a bus and used for computing and processing the massive data 155 in the storage medium 150.

As described in detail above, the main control computer 100 to which the present invention is applied will read a series of operation instructions stored in the storage medium 150 through the central processing unit 170 to perform autonomous driving control.

Figure 2:
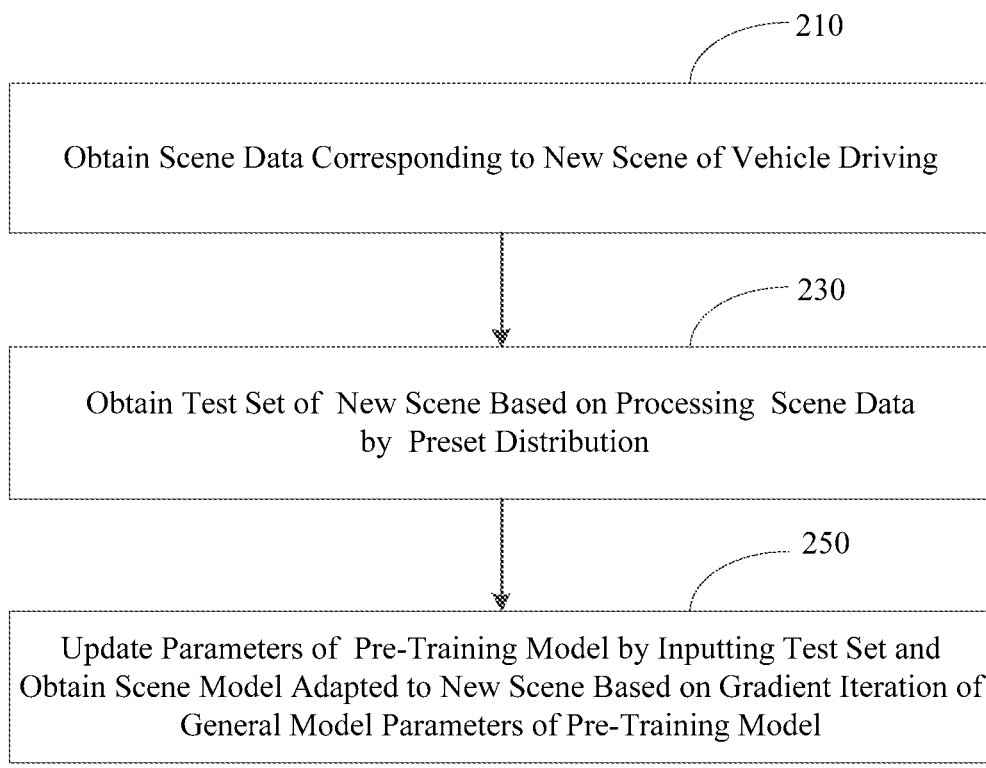
FIG. 2 is a flowchart showing an adaptive processing method for new scenes in autonomous driving, according to an exemplary embodiment.

FIG. 2 is a flowchart of an adaptive processing method for new scenes in autonomous driving, according to an exemplary embodiment. Referring to FIG. 2, the method includes the following steps.

Step 210, obtain scene data corresponding to the new scene of vehicle driving, wherein the scene data describes vehicles state and driving operations in the new scene;

Step 230, obtain a test set of the new scene based on processing the scene data by a preset distribution;

Step 250, update parameters of a pre-training model by inputting the test set, and obtaining a scene model adapted to the new scene based on gradient iteration of general model parameters of the pre-training model, wherein the scene model is configured to output an autonomous driving strategy for the vehicle in the new scene.

Therefore, the adaptive processing method for new scenes in autonomous driving could be realized. Based on a test set with a limited amount of data and a pre-training model to learn the execution of autonomous driving in a new scene to obtain a scene model adapted to the new scene, then, the scene model is applied to autonomous driving in this new scene.

It could first be explained that the new scene referred to is different from any prescribed scene configured for the autonomous vehicle, the new scene is an unknown scene, and the autonomous vehicle may not be driven safely and reliably in this new scene. For example, the autonomous driving vehicle performs scene learning and automatic driving strategy output under massive scene data and the massive scene data describes various defined known scenes. Once entering a new scene, the autonomous vehicle needs to be able to adapt to the new scene so that it can continue to drive autonomously in this new scene and avoid a large number of unforeseen hazards.

For a new scene, obtain the scene data generated by the vehicle running in the new scene, the scene data describes the state of the subject vehicle and surrounding vehicles in the new scene, for example, the position and speed of surrounding vehicles and the subject vehicle. Meanwhile, the scene data also includes driving data, which describes the driving strategy executed under the state of the subject vehicle and surrounding vehicles, such as lane changing decision.

The acquisition of the scene data corresponding to the new scene could be collected through the driver's takeover of the vehicle in the new scene also could be collected through the test of the vehicle. And the scene data obtained by different vehicles in the same new scene could be shared with each other to ensure the execution of adaptive processing of the new scene. In term of data volume, the scene data of the new scene will be significantly less than the large sample data used for machine learning.

Because the state of the vehicle and the driving strategy implemented are different in different scenes, the scenes have significant recognizability. Therefore, the scene data corresponding to each scene is independent and distinguishable. This is the data basis to ensure that the autonomous driving accurately recognizes the scene and the autonomous driving consistency. After obtaining the scene data corresponding to the new scene, the step 230 is executed to obtain a test set with strong distinguishability.

The obtained scene data is distinguished to realize the distinguishing of scene distribution, and a new scene test set independent of other scene distributions is obtained. The distribution based here is not specific, it is selected according to the differentiated control performed, and for example, it could be the mean and/or variance of the scene data distribution.

Through the test set of the new scene, updating the general model parameters in a pre-training model, so as to realize the fine-tuning of the general model parameters to adapt to the new scene, and to obtain the scene model adapted to the new scene.

Specifically, the pre-training model is obtained based on the data set for model training for all known scenes. Compared with the test set, the data set has a larger amount of data volume. And each data set corresponds to a known scene. Compared with the new scene adaptation process of autonomous driving, model pre-training is implemented through training tasks corresponding to known scenes. And through the pre-training of the model, the optimal model parameters are found on multiple training tasks with large data sets, which are used as general model parameters to obtain the pre-training model.

With the actual operation of the autonomous driving on the vehicle, the automatic control of the vehicle could be implemented in several known scenes. So, once entering a new scene, the pre-training model will be updated and iterated under the support of the test set, the process of the update iteration is controlled by an iterative method of gradient descent to obtain optimized model parameters for the new scene, and then obtain the scene model of the new scene.

So far, the autonomous driving vehicle transforms a new scene to a known scene, and no longer be troubled by unpredictable new scenes, and greatly enhance the reliability and stability of autonomous driving.

By analogy, as the adaptive processing of new scenes continue to increase, the scenes applicable to autonomous vehicles also increase correspondingly, finally, the autonomous vehicle could be driven autonomously in all scenes.

In another exemplary embodiment, the step 210 comprising: obtaining the scene data based on actual driving of the vehicle in the new scene, wherein the data volume of the scene data is relatively less than the data set of the pre-training model.

As described above, the data set of the pre-trained model is larger in data volume than the test set of the new scene. The data set corresponds to each known scene; the data set is a large amount of sample data to obtain from the pre-training model, but the test set is not the case. Different from the data set, the test set is configured to realize the fine-tuning of the general model parameters under a small amount of data, on the one hand, it ensures the calculation speed and quickly adapts to the new scene, and on the other hand, it also guarantees the availability of the data in the new scene.

Figure 3:
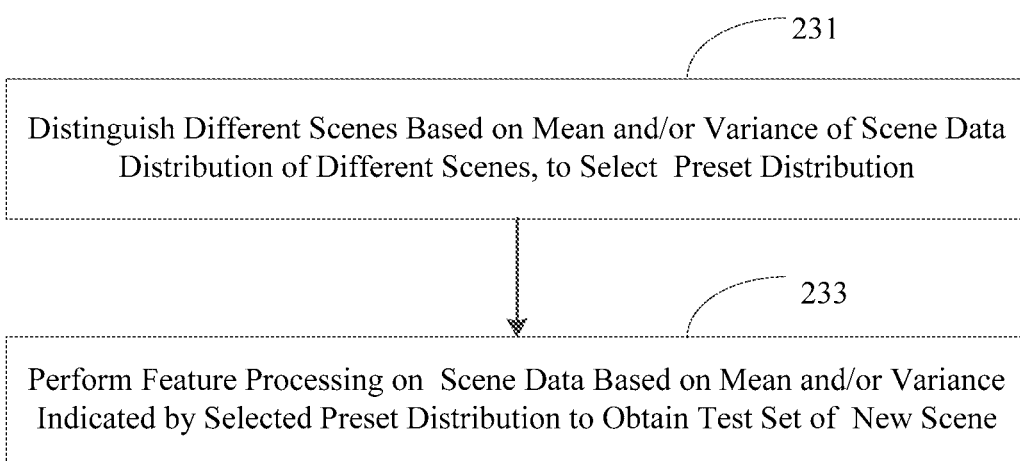
FIG. 3 is a flow chart illustrating step 230 according to the embodiment corresponding to FIG. 2.

FIG. 3 is a flow chart illustrating step 230 according to the embodiment corresponding to FIG. 2. In an exemplary embodiment, as shown in FIG. 3, the step 230 includes following steps.

Step 231, distinguish different scenes based on mean and/or variance of scene data distribution of different scenes to select a preset distribution;

Step 233, perform feature processing on the scene data based on the mean and/or variance indicated by the selected preset distribution to obtain a test set of the new scene.

First of all, it should be noted that before the model is pre-trained, the data set needs to be differentiated and controlled for each known scene to obtain independent scene distribution. Correspondingly, the test set configured to perform model iteration update also needs to be differentiated and controlled accordingly, so as to ensure that it can characterize its corresponding new scene on the data.

Based on this, through the mean and/or variance of the scene data distribution to ensure the distinction of scene distributions, according to either of the two methods, or the combination of the two to obtain the distinguishing effect to select the preset distribution. After selecting the preset distribution, the scene data could be processed to obtain the test set.

In another exemplary embodiment, the step 250 comprises performing gradient descent update of model parameters in the pre-trained model through the test set, to obtain a scene model fine-tuned with general model parameters, wherein the scene model is adapted to the new scene.

The pre-training model is obtained by performing the training task on the given derivative function to obtain the general model parameters, and to update the model itself through the model parameters. Understandably, this process has nothing to do with the model itself, regardless of the structure of the model selected, the general model parameters will be obtained in this way with the support of the data set, and then the model itself will be updated.

Specifically, for a given derivable function, in an exemplary embodiment, it could be:

$$\theta_i' = \theta - \nabla_\theta L_{\tau_i}(f_\theta)$$

Where, $f_\theta$ represents the model, $\theta$ is model parameter, $\tau$ represents the scene, and the model structure could have different choices, such as multi-layer neural network or LSTM.

For scene $\tau_i$, its parameters are updated through gradient descent, which is:

$$\theta^* = \theta - \nabla_\theta \Sigma_{\tau_i \sim p(T)} L_{\tau_i}(f_{\theta_i'})$$

Wherein, it is the first derivative of $\theta$ when calculating $\theta_i'$ and it is the second derivative of $\theta$ when calculating $\theta^*$.

So far, with the support of the test set, the model parameters corresponding to the new scene are obtained from the iterative update of the general model parameters.

In another exemplary embodiment, after the step 250, the method also comprises: perform model pre-training on different training tasks corresponding to a scene through differentiated control of the scene distribution on the data set, to obtain the pre-trained model with the general model parameters initialized.

The realization of automatic driving relies on the calculation and decision-making of the pre-training model and the pre-training model is pre-trained with the support of the data set. It should be understood that the scene referred to here is the known scene enumerated.

Figure 4:
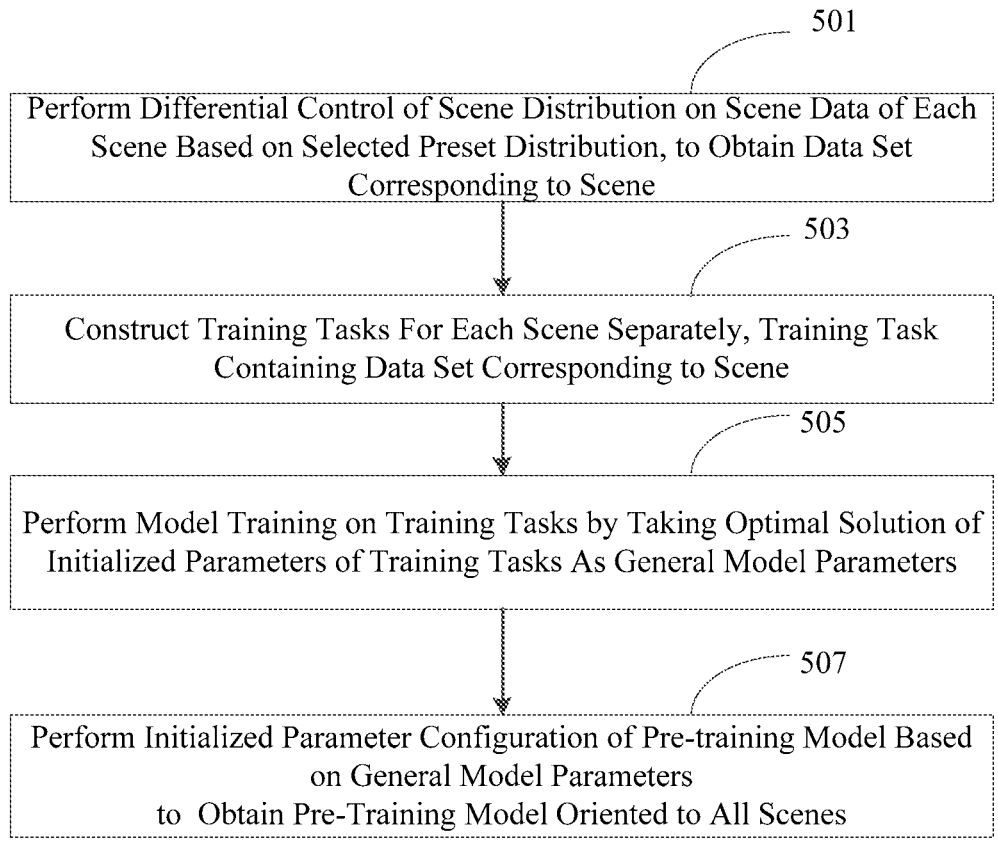
FIG. 4 is a flow chart illustrating the steps of obtaining a pre-training model, according to an exemplary embodiment.

FIG. 4 is a flow chart illustrating the steps of obtaining a pre-training model according to an exemplary embodiment. In this exemplary embodiment, the acquisition of the pre-training model, as shown in FIG. 4, includes the following steps.

Step 501, perform differential control of scene distribution on scene data of each scene of each scene based on the selected preset distribution, to obtain a data set corresponding to the scene;

Step 503, construct training tasks for each scene separately, the training task containing a data set corresponding to the scene;

Step 505, perform model training on the training tasks by taking an optimal solution of initialized parameters of training tasks as general parameters;

Step 507, perform initialized parameter configuration of the pre-training model based on the general model parameters to obtain the pre-training model oriented to all scenes.

There is a corresponding training task for any known scene, and the training task contains a data set corresponding to the known scene. The data set includes the training set and the verification set; they are all obtained from the scene data of the known scenes by performing scene distribution control.

Regardless of the structure and type of model selected, model training is performed on the constructed training task to obtain the optimal solution of parameters for multiple training tasks, which are initialized as general model parameters.

Figure 5:
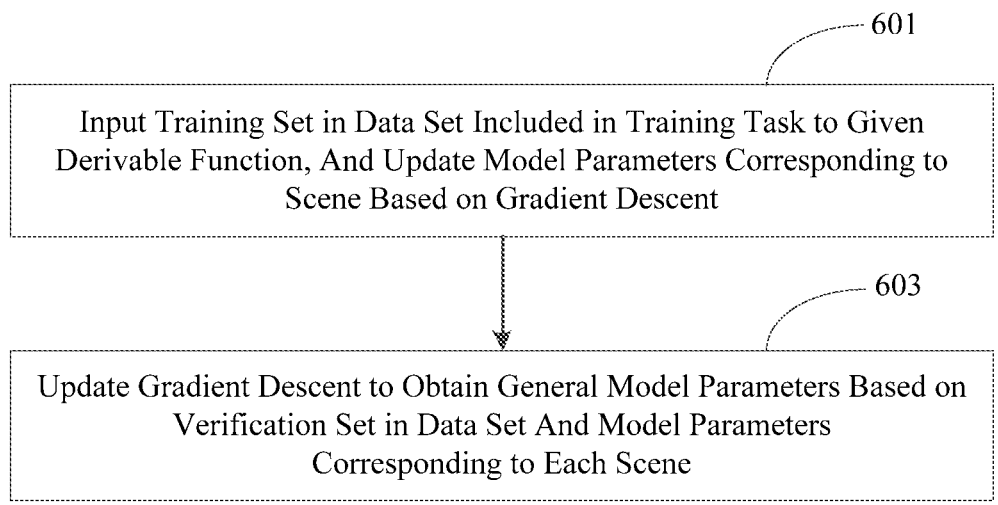
FIG. 5 is a flow chart of the step 505 according to an exemplary embodiment.

FIG. 5 is a flow chart of the step 505 according to an exemplary embodiment. In the exemplary embodiment, as shown in FIG. 5, the step 505 includes following steps.

Step 601, input a training set in the data set included in the training task to a given derivable function, and update model parameters corresponding to the scene based on gradient descent.

Step 603, update gradient descent to obtain the general model parameters based on the verification set in the data set and model parameters corresponding to each scene.

Similar to the update of general model parameters, in the exemplary embodiment, the given derivable function could be:

$$\theta_i' = \theta - \nabla_\theta L_{\tau_i}(f_\theta)$$

Where, $f_\theta$ represents the model, $\theta$ is the model parameter, $\tau$ represents the scene and the model structure could have different choices, such as multi-layer neural network or LSTM.

For scene $\tau_i$, its parameters are updated through gradient descent, which is:

$$\theta^* = \theta - \nabla_\theta \Sigma_{\tau_i \sim p(T)} L_{\tau_i}(f_{\theta_i'})$$

Where, it is the first derivative of $\theta$ when calculating $\theta_i'$, it is the second derivative of $\theta$ when calculating $\theta^*$.

The data set includes training set $D_{train}^i$ and verification set $D_{vai}^i$, When calculating $L_{\tau_i}(f_\theta)$, use training set $D_{train}^i$, and when calculating $L_{\tau_i}(f_{\theta_i'})$, use validation set $D_{vai}^i$. The loss function is cross entropy or mean square error.

Figure 6:
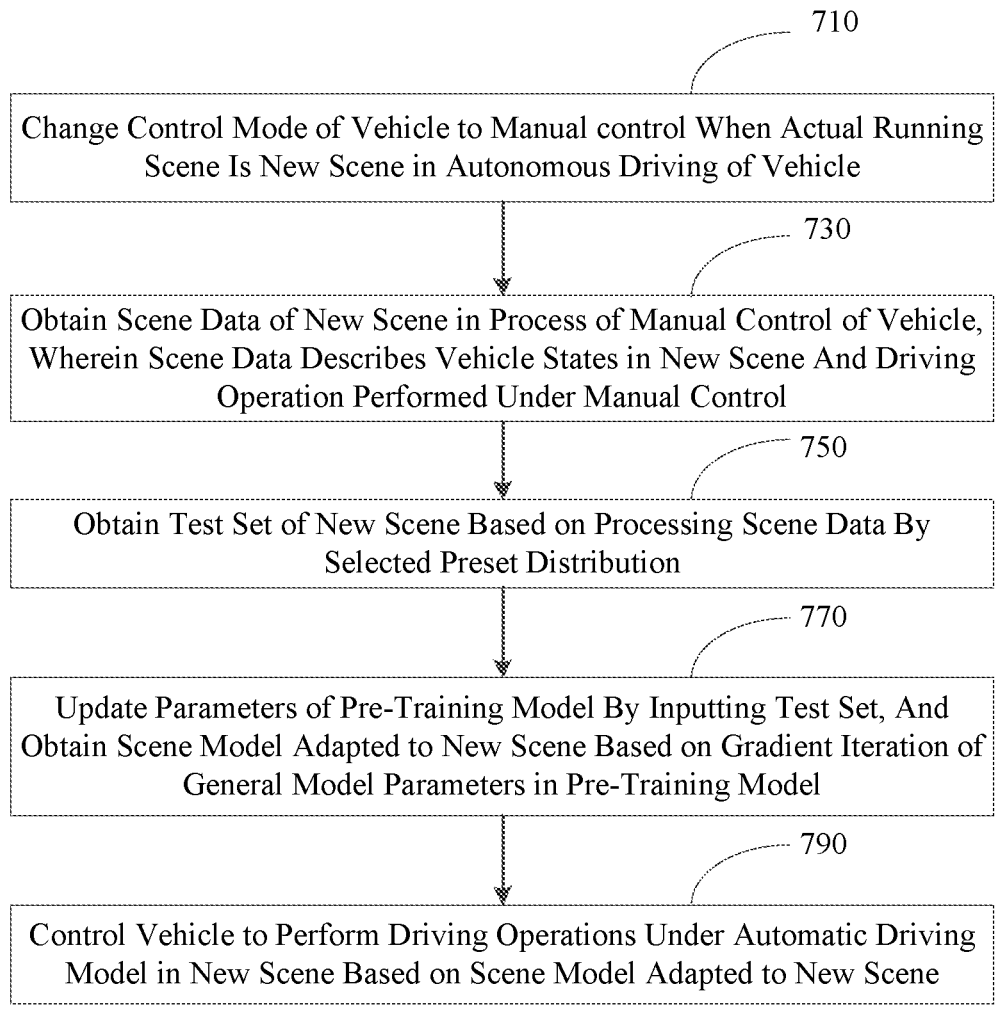
FIG. 6 is a flowchart showing the autonomous driving method according to an exemplary embodiment.

There is also provided an autonomous driving method. FIG. 6 is a flowchart showing the autonomous driving method according to an exemplary embodiment. As shown in FIG. 6, the automatic driving method includes following steps.

Step 710, change the control mode of the vehicle to manual control when the actual running scene is a new scene in autonomous driving of a vehicle.

Step 730, obtain scene data of the new scene in the process of manual control of the vehicle, wherein the scene data describes vehicle states in the new scene and the driving operation performed under the manual control.

Step 750, obtain a test set of the new scene based on processing the scene data by selected preset distribution.

Step 770, update parameters of a pre-training model by inputting the test set, and obtain a scene model adapted to the new scene based on gradient iteration of general model parameters in the pre-training model.

Step 790, control the vehicle to perform driving operations under automatic driving model in the new scene based on the scene model adapted to the new scene.

Through the realization of autonomous driving as described above, the autonomous vehicle could adapt to unknown scenes, and use limited data to realize automatic control, and performance of driving will be improved continuously.

Based on the adaptive processing method for new scenes in autonomous driving and the autonomous driving method realized by this application, using the "small data, big task" paradigm to develop autonomous driving strategies, and even a small amount of training on the vehicle can also adapt to untrained scenes.

The following are device embodiments of the present invention, which are configured to implement the foregoing method embodiments of the present invention. For details not disclosed in the device embodiment of the present invention, please refer to the method embodiment of the present invention.

Figure 7:
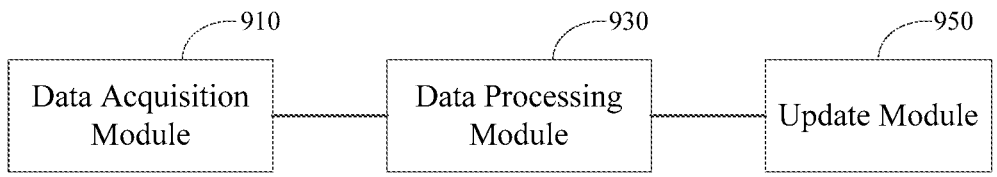
FIG. 7 is a block diagram of a device for adaptive processing for new scenes in autonomous driving according to an exemplary embodiment.

FIG. 7 is a block diagram of a device for adaptive processing of new scenes in autonomous driving according to an exemplary embodiment. As shown in FIG. 7, the adaptive processing device for new scenes in autonomous driving includes but is not limited to:

data acquisition module 910, configured to obtain scene data corresponding to new scene of vehicle driving, wherein the scene data describes vehicles state and driving operations in the new scene;

data processing module 930, configured to obtain a test set of the new scene based on processing the scene data by a preset distribution;

update module 950, configured to update parameters of a pre-training model by inputting the test set and obtaining a scene model adapted to the new scene based on gradient iteration of general model parameters of the pre-training model, wherein the scene model is configured to output an autonomous driving strategy for the vehicle in the new scene.

Optionally, there is provides an autonomous driving system, which is deployed on a vehicle and executes all or part of the steps of the method shown in any one of FIGS. 3, 4, 5, 6 and 7. The system at least includes a processor and a memory, and executable instructions are storied on the memory. Wherein the processor is configured to execute the aforementioned method.

Optionally, there is provides a computer readable storage medium, the computer readable storage medium stores a computer program for exchanging electronic data, and the computer program causes a computer to perform the above-referenced adaptive processing method for new scenes in autonomous driving of the embodiments of the present disclosure.

Optionally, there is provides a computer program product, the computer program product comprises a non-transitory computer readable storage medium storing a computer program, and the computer program may be operated to cause a computer to perform the above-referenced adaptive processing method for new scenes in autonomous driving of the embodiments of the present disclosure.

Optionally, there is provides a computer readable storage medium, the computer readable storage medium stores a computer program for exchanging electronic data, and the computer program causes a computer to perform the above-referenced autonomous driving method of the embodiments of the present disclosure.

Optionally, there is provides a computer program product, the computer program product comprises a non-transitory computer readable storage medium storing a computer program, and the computer program may be operated to cause a computer to perform the above-referenced autonomous driving method of the embodiments of the present disclosure.

The operations that could be performed by the processor in the system in this embodiment have been described in detail in the foregoing embodiment, and will not be elaborated here.

What is claimed is:

1. An adaptive processing method for new scenes in autonomous driving, comprising:
    obtaining scene data corresponding to new scene of vehicle driving, wherein the scene data describes vehicles state and driving operations in the new scene;
    obtaining a test set of the new scene based on processing the scene data by a preset distribution;
    updating parameters of a pre-training model by inputting the test set and obtaining a scene model adapted to the new scene based on gradient iteration of general model parameters of the pre-training model, wherein the scene model is configured to output an autonomous driving strategy for the vehicle in the new scene.

2. The method of claim 1, wherein obtaining scene data corresponding to new scene of vehicle driving, comprises:
    obtaining the scene data based on actual driving of the vehicle in the new scene, wherein the data volume of the scene data is relatively less than the data set of the pre-training model.

3. The method of claim 1, wherein obtaining a test set of the new scene based on processing the scene data by a preset distribution, comprises:
    distinguishing different scenes based on mean and/or variance of scene data distribution of different scenes, to select a preset distribution;
    performing feature processing on the scene data based on the mean and/or variance indicated by the selected preset distribution to obtain a test set of the new scene.

4. The method of claim 1, wherein updating parameters of a pre-training model by inputting the test set, and obtaining a scene model adapted to the new scene based on gradient iteration of general model parameters in the pre-training model, comprises:
    performing gradient descent update of model parameters in the pre-trained model through the test set, to obtain a scene model fine-tuned with general model parameters, wherein the scene model is adapted to the new scene.

5. The method of claim 1 further comprising:
    performing model pre-training on different training tasks corresponding to a scene through differentiated control of the scene distribution on the data set, to obtain the pre-trained model with the general model parameters initialized.

6. The method of claim 5, wherein performing model pre-training on different training tasks corresponding to a scene through differentiated control of the scene distribution on the data set, to obtain the pre-trained model with the general model parameters initialized, comprises:
    performing differential control of scene distribution on the scene data of each scene based on the selected preset distribution, to obtain the data set corresponding to the scene;
    constructing training tasks for each scene separately, the training task containing the data set corresponding to the scene;
    performing model training on the training tasks by taking an optimal solution of initialized parameters of training tasks as the general model parameters;
    performing initialized parameter configuration of the pre-training model based on the general model parameters to obtain the pre-training model oriented to all scenes.

7. The method of claim 6, wherein performing model training on the training tasks by taking an optimal solution of initialized parameters of training tasks as the general model parameters, comprises:
    inputting a training set in the data set included in the training task to a given derivable function, and updating model parameters corresponding to the scene based on gradient descent;
    updating gradient descent to obtain general model parameters based on the verification set in the data set and model parameters corresponding to each scene.

8. An autonomous driving method comprising:
    changing the control mode of the vehicle to manual control when the actual running scene is a new scene in autonomous driving of a vehicle;
    obtaining scene data of the new scene in the process of manual control of the vehicle, wherein the scene data describes vehicle states in the new scene and the driving operation performed under the manual control;
    obtaining a test set of the new scene based on processing the scene data by selected preset distribution;
    updating parameters of a pre-training model by inputting the test set, and obtaining a scene model adapted to the new scene based on gradient iteration of general model parameters in the pre-training model;
    controlling the vehicle to perform driving operations under automatic driving model in the new scene based on the scene model adapted to the new scene.

9. An autonomous driving system, the automatic driving system is deployed on a vehicle, and comprises a processor and a memory, computer-readable instructions are stored on the memory; when the computer-readable instructions are executed by the processor, realize steps of an adaptive processing method for new scenes in autonomous driving, comprising:
    obtaining scene data corresponding to new scene of vehicle driving, wherein the scene data describes vehicles state and driving operations in the new scene;
    obtaining a test set of the new scene based on processing the scene data by a preset distribution;
    updating parameters of a pre-training model by inputting the test set, and obtaining a scene model adapted to the new scene based on gradient iteration of general model parameters of the pre-training model, wherein the scene model is configured to output an autonomous driving strategy for the vehicle in the new scene.

10. The system of claim 9, wherein obtaining scene data corresponding to the new scene of vehicle driving, comprises:
    obtaining the scene data based on actual driving of the vehicle in the new scene, wherein the data volume of the scene data is relatively less than the data set of the pre-training model.

11. The system of claim 9, wherein obtaining a test set of the new scene based on processing the scene data by a preset distribution, comprises:
    distinguishing different scenes based on mean and/or variance of scene data distribution of different scenes to select a preset distribution;
    performing feature processing on the scene data based on the mean and/or variance indicated by the selected preset distribution to obtain a test set of the new scene.

12. The system of claim 9, wherein updating parameters of a pre-training model by inputting the test set, and obtaining a scene model adapted to the new scene based on gradient iteration of general model parameters in the pre-training model, comprises:

performing gradient descent update of model parameters in the pre-trained model through the test set, to obtain a scene model fine-tuned with general model parameters, wherein the scene model is adapted to the new scene.

13. The system of claim 9, further comprising:

performing model pre-training on different training tasks corresponding to a scene through differential control of the scene distribution on the data set, to obtain the pre-trained model with the general model parameters initialized.

14. The system of claim 13, wherein performing model pre-training on different training tasks corresponding to a scene through differential control of the scene distribution on the data set, to obtain the pre-trained model with the general model parameters initialized, comprises:

performing differential control of scene distribution on the scene data of each scene based on the selected preset distribution, to obtain the data set corresponding to the scene;

constructing training tasks for each scene separately, the training task containing the data set corresponding to the scene;

performing model training on the training tasks by taking an optimal solution of initialized parameters of training tasks as the general model parameters;

performing initialized parameter configuration of the pre-training model based on the general model parameters to obtain the pre-training model oriented to all scenes.

15. The system of claim 14, wherein performing model training on the training tasks by taking an optimal solution of initialized parameters of training tasks as the general model parameters, comprises:

inputting a training set in the data set included in the training task to a given derivable function, and updating model parameters corresponding to the scene based on gradient descent;

updating gradient descent to obtain general model parameters based on the verification set in the data set and model parameters corresponding to each scene.

* * * * *